US012724699B2

(12) United States Patent
Bragaia et al.

(10) Patent No.: US 12,724,699 B2
(45) Date of Patent: Sep. 1, 2026

(54) AUTOMATION OF SOFTWARE TEST CASE GENERATION AND IMPLEMENTATION

(71) Applicant: MICROSOFT TECHNOLOGY LICENSING, LLC, Redmond, WA (US)

(72) Inventors: Igor Bragaia, Redmond, WA (US); Judenique Brierna Auguste, Redmond, WA (US); Alycia Yohsuan Habo Lee, Redmond, WA (US); Laurentiu Titi Nedelcu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 223 days.

(21) Appl. No.: 18/471,986

(22) Filed: Sep. 21, 2023

(65) Prior Publication Data

US 2025/0103471 A1 Mar. 27, 2025

(51) Int. Cl.
*G06F 11/3668* (2025.01)
*G06F 11/3604* (2025.01)
*G06F 11/3698* (2025.01)

(52) U.S. Cl.
CPC ...... *G06F 11/3684* (2013.01); *G06F 11/3608* (2013.01); *G06F 11/3698* (2025.01)

(58) Field of Classification Search
CPC ............. G06F 11/3684; G06F 11/3698; G06F 11/3608
USPC .......................................................... 717/126
See application file for complete search history.

(56) References Cited

U.S. PATENT DOCUMENTS

| | | | | |
|---|---|---|---|---|
| 10,073,763 | B1 * | 9/2018 | Raman | G06F 11/3684 |
| 10,983,904 | B1 * | 4/2021 | Sundararaman | G06F 11/3684 |
| 11,436,130 | B1 * | 9/2022 | Patnaik | G06F 11/3608 |
| 11,604,719 | B2 * | 3/2023 | Clement | G06F 11/3688 |
| 11,893,363 | B2 * | 2/2024 | Drain | G06F 11/3684 |
| 12,282,411 | B2 * | 4/2025 | Zhang | G06F 8/42 |
| 2018/0349256 | A1 * | 12/2018 | Fong | G06F 11/3684 |
| 2020/0117580 | A1 * | 4/2020 | Lekivetz | G06F 11/3688 |
| 2023/0012264 | A1 * | 1/2023 | Venugopal | G06F 11/3075 |

(Continued)

*Primary Examiner* — Wei Y Mui
*Assistant Examiner* — Brahim Bourzik
(74) *Attorney, Agent, or Firm* — Newport IP, LLC; Jacob P. Rohwer

(57) ABSTRACT

The techniques disclosed herein enhance software testing through automated test case generation and implementation. This is accomplished through utilizing a natural language interface and a generative probabilistic model, such as a large language model. A first user input can provide descriptions of a software feature to be tested and various use cases for the software feature. Accordingly, the probabilistic model generates a plurality of test cases for evaluating various aspects of the software feature in accordance with the first user input. The natural language descriptions can be accompanied by a contextual input to constrain the probabilistic model and ensure consistent outputs. Subsequently, a second user input selects a test case from the generated test cases to be implemented. In response, the probabilistic model generates a software implementation of the selected test case. The software implementation is then executed with log data extracted from the testing environment for processing results.

14 Claims, 13 Drawing Sheets

(56) References Cited

U.S. PATENT DOCUMENTS

| | | | | |
|---|---|---|---|---|
| 2023/0205678 | A1* | 6/2023 | Bollepally | G06F 11/3684 717/124 |
| 2023/0308381 | A1* | 9/2023 | Tahvili | G06F 11/3684 |
| 2024/0330157 | A1* | 10/2024 | Somawagol | G06F 11/3676 |
| 2024/0330159 | A1* | 10/2024 | Somawagol | G06F 11/3684 |
| 2024/0330169 | A1* | 10/2024 | Hicks | G06F 11/3684 |
| 2025/0315365 | A1* | 10/2025 | Kaul | G06F 11/3684 |

* cited by examiner

Figure 5A:
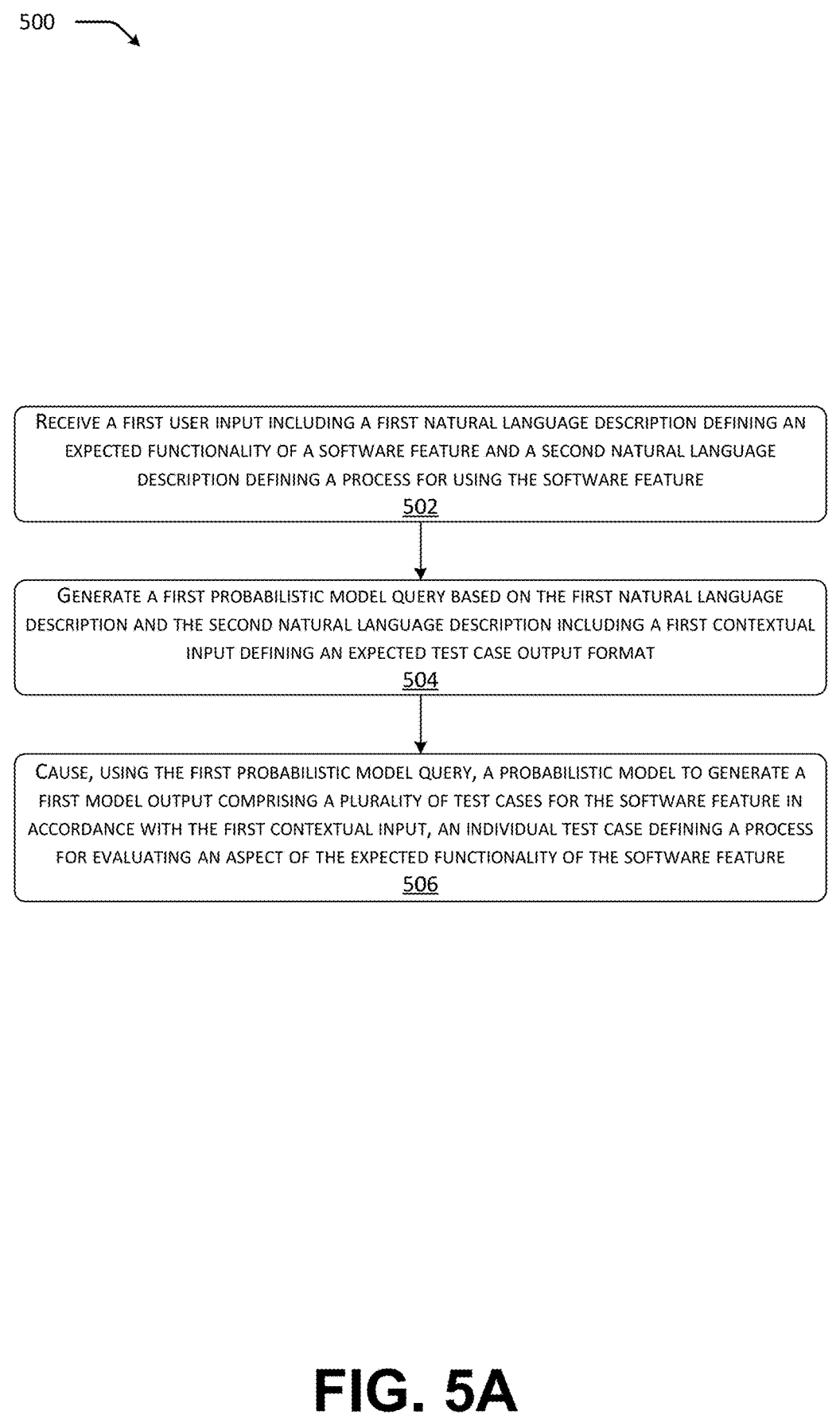

500

RECEIVE A FIRST USER INPUT INCLUDING A FIRST NATURAL LANGUAGE DESCRIPTION DEFINING AN EXPECTED FUNCTIONALITY OF A SOFTWARE FEATURE AND A SECOND NATURAL LANGUAGE DESCRIPTION DEFINING A PROCESS FOR USING THE SOFTWARE FEATURE
502

GENERATE A FIRST PROBABILISTIC MODEL QUERY BASED ON THE FIRST NATURAL LANGUAGE DESCRIPTION AND THE SECOND NATURAL LANGUAGE DESCRIPTION INCLUDING A FIRST CONTEXTUAL INPUT DEFINING AN EXPECTED TEST CASE OUTPUT FORMAT
504

CAUSE, USING THE FIRST PROBABILISTIC MODEL QUERY, A PROBABILISTIC MODEL TO GENERATE A FIRST MODEL OUTPUT COMPRISING A PLURALITY OF TEST CASES FOR THE SOFTWARE FEATURE IN ACCORDANCE WITH THE FIRST CONTEXTUAL INPUT, AN INDIVIDUAL TEST CASE DEFINING A PROCESS FOR EVALUATING AN ASPECT OF THE EXPECTED FUNCTIONALITY OF THE SOFTWARE FEATURE
506

Figure 7:
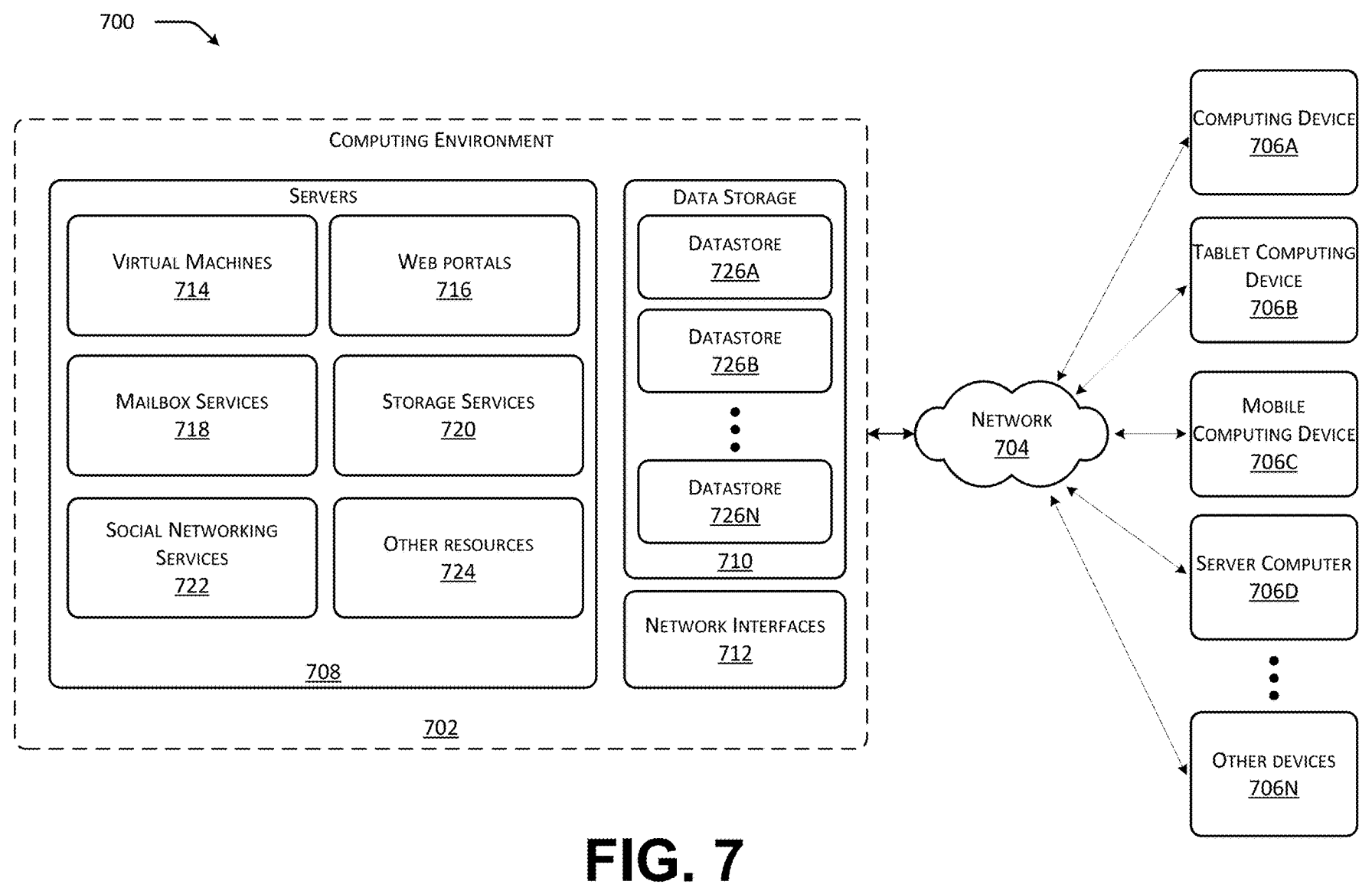

Computing Device 706A

Tablet Computing Device 706B

Mobile Computing Device 706C

Server Computer 706D

Other devices 706N

Network 704

Computing Environment

Servers

Virtual Machines 714

Web portals 716

Mailbox Services 718

Storage Services 720

Social Networking Services 722

Other resources 724

708

Data Storage

Datastore 726A

Datastore 726B

Datastore 726N

710

Network Interfaces 712

AUTOMATION OF SOFTWARE TEST CASE GENERATION AND IMPLEMENTATION

BACKGROUND

In software development, an important but oftentimes neglected component is testing. Generally described, software testing involves examining the behavior of a given piece of software under various conditions by validating and verifying said behavior against a test framework. Primarily, software testing can enable a developer to ensure that basic functionality of the software operates as intended. Moreover, software testing can detect certain software failures such that defects (e.g., bugs) of the software under test can be uncovered and corrected.

However, software testing is typically a heavily manual process. For example, a software test can include a definition of a particular feature to be tested, step-by-step instructions for conducting the test, as well as additional code to implement the test. As such, designing and implementing software tests can be time-consuming and tedious, often resulting in test frameworks that are poorly defined or even nonexistent.

Furthermore, the challenge of designing and implementing software tests can be exacerbated by the complexity of the overall software product. For example, a developer may be implementing a particular feature of a larger product such as an interactable widget in a graphical user interface (GUI) for a web browser. Accordingly, testing the interactable widget can involve many additional components of the graphical user interface and internal systems of the web browser. In this way, developing well-defined and descriptive software tests in large scale applications can be highly complex and place undue burden on developers. It is with respect to these and other considerations that the disclosure herein is presented.

SUMMARY

The techniques disclosed herein enhance software testing through automated test case generation and implementation utilizing a generative probabilistic model. A probabilistic model can be any general-purpose artificial intelligence (AI) application, such as a large language model (LLM), that supports an individual input modality and/or any combination of input modalities (e.g., text, image, audio). In the context of the present disclosure, the probabilistic model can be deployed as an instruction-following generative artificial intelligence application (e.g., a chatbot). Accordingly, the generative artificial intelligence application can implement a transformer-based large language model. Unlike other artificial intelligence models, such as recurrent neural networks and long short-term memory (LSTM) models, transformer-based large language models make use of a native self-attention mechanism to identify vague context from limited available data and even synthesize new content from images to code.

As such, a probabilistic model utilizing a large language model such as generative pre-trained transformers (GPTs) can be uniquely effective for automating the typically manual process of software test case generation and implementation. As mentioned above, a software test can include a well-defined list of steps in a natural language such as English and an associated software implementation in a programming language such as JAVASCRIPT. Consequently, manually generating and implementing such software tests can impose an undue burden on software developers who are often subject to technical and temporal constraints, often leading to poorly defined or nonexistent software test frameworks.

Moreover, even in the event a developer can invest the time to manually develop descriptive and thorough end-to-end software tests, the process can be highly complex and thus error prone. This technical challenge can be further exacerbated in enterprise development contexts in which the final software product can involve dozens of disparate systems and features. Consequently, despite a developer's best efforts, the complexity of manual software test generation in certain contexts can nonetheless lead to poor test coverage, a lack of clarity, and ultimately, a degraded user experience.

To address these and other technical challenges, the system discussed herein provides a natural language (e.g., chat) interface to enable a user (e.g., a software developer) to automate the process of software test generation and implementation utilizing natural language descriptions (e.g., English) and a probabilistic model such as a large language model. In various examples, a first natural language description can define the expected functionality of a particular software feature to be tested while a second natural language description can describe a process for activating the software feature. For example, the first natural language description can identify the software feature as part of a greater software application (e.g., a web browser) as well as additional details such as the feature type. The second natural language description can provide example use cases that illustrate various functionalities of the software feature to be tested.

The disclosed system can subsequently process the natural language descriptions to generate a first probabilistic model query. Often referred to as a prompt, a probabilistic model query is any user generated input to which the probabilistic model is to respond. In various examples, the probabilistic model query can include instructions, questions, or other types of input and can be formatted in any suitable manner (e.g., text, images, audio). In the context of the present disclosure, the first probabilistic model query can instruct the probabilistic model to generate test cases for the software feature based on the user provided descriptions. In addition, the first probabilistic model query can include a first contextual input that defines an expected test case output. In a specific example, the first contextual input can include an example test case that provides the probabilistic model with a well-defined format to follow when generating test cases.

Accordingly, the first probabilistic model query can cause the probabilistic model to respond with a first output that includes a plurality of test cases for the software feature described by the initial user input. Moreover, the test cases generated by the probabilistic model can follow the example provided by the first contextual input in format and content. In various examples, an individual test case of the plurality of test cases can define a process for evaluating an aspect of the expected functionality of the software feature (e.g., step-by-step instructions). Furthermore, the test case can include success conditions that define an expected outcome of the process.

The test cases can be subsequently displayed in the natural language interface for examination by the user. Accordingly, the user can select one or several test cases from the plurality of test cases generated by the probabilistic model. In response, the disclosed system can generate a second probabilistic model query to instruct the probabilistic model to produce a software implementation of the selected test case. The second probabilistic model query can include the selected test case in its entirety as well as a second contextual input that defines an expected software implementation output. In various examples, the second contextual input can specify the programming language to be used as well as provide generic software functions for the probabilistic model to utilize in implementing the selected test case.

Like the first probabilistic model query above, the second probabilistic model query can be provided to the probabilistic model to cause the probabilistic model to generate a software implementation of the selected test case. In various examples, the software implementation is program code that executes the process outlined by the step-by-step instructions of the software test. In a specific example, the test can involve a series of graphical user interface (GUI) interactions to validate and verify proper functionality. As such, the associated software implementation can comprise a series of automated commands that manipulate the graphical user interface. Moreover, the software implementation can be further processed by the disclosed system to ensure that there are no syntactical errors.

The disclosed system can subsequently display the generated software implementation to the user in the natural language interface. In various examples, the user can be prompted to accept the software implementation or optionally decline and/or modify the software implementation. Upon acceptance, the present system can execute the software implementation to perform the process defined by the software test. Subsequently, the system can collect log data defining an outcome of the execution of the software implementation. The log data can be compared against the success conditions to determine the success or failure of the software test. The software tests can be subsequently checked into a repository along with the source code of the associated software feature.

In contrast to existing approaches, the disclosed system can automate the process of generating (e.g., brainstorming) and implementing software tests. In this way, the present system can alleviate the technical and temporal burden of manually developing software tests, thereby improving the efficiency and productivity of software development efforts. This benefit can be amplified in enterprise scenarios in which a given software feature can be a component of a much larger and more complex product. While the examples discussed herein relate generally to graphical user interface testing, it should be understood that the disclosed techniques can be applied to any suitable scenario. In a specific example, the disclosed techniques can be utilized to evaluate data processing features in a digital database (e.g., a relational database). In this example, the disclosed system generates tests that verify the correctness of input/output behavior in accordance with predefined expected behaviors. In another example, the disclosed techniques can be utilized to evaluate network performance features (e.g., in a cloud environment) utilizing automated tests verifying data integrity, network speed, and/or other expected behaviors.

In another example of the technical benefit of the present disclosure, automating software test generation and implementation can improve the quality of software testing and, consequently, the user experience of final software products. For example, in existing workflows, a developer may forgo testing a given feature due to complexity, deadlines or other factors. As such, the feature may be submitted for integration without prior validation or verification. While subsequent testing by separate teams can rectify potential issues, such approaches may nonetheless leave additional issues undetected. As such, a product may ship to end users with a degraded user experience. In contrast, by automatically generating and implementing descriptive and well-defined test cases, the present system can empower individual developers to properly evaluate software features. Moreover, by enabling the generated software tests to be checked in along with the source code of the associated software feature, the disclosed system can enable improved visibility in the software development process.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 5A is a flow diagram showing aspects of a process for automated software test case generation.

FIG. 7 is a diagram illustrating a distributed computing environment capable of implementing aspects of the techniques and technologies presented herein.

DETAILED DESCRIPTION

The techniques discussed herein enhance the functionality of software development systems and processes through a natural language interface and probabilistic model to automate software test case generation and implementation. As discussed above, manually generating and implementing software test cases can impose undue technical burden on software developers. This is especially so in enterprise contexts in which the software products are complex, and deadlines are stringent. As such, many software features may be implemented with poorly defined or even nonexistent testing processes. By automating this process, the disclosed system can ease the technical burden of developing software tests while ensuring descriptive and thorough software test cases.

Various examples, scenarios, and aspects that enable automated software test case generation and implementation are described below with respect to FIGS. 1-7.

Figure 1:
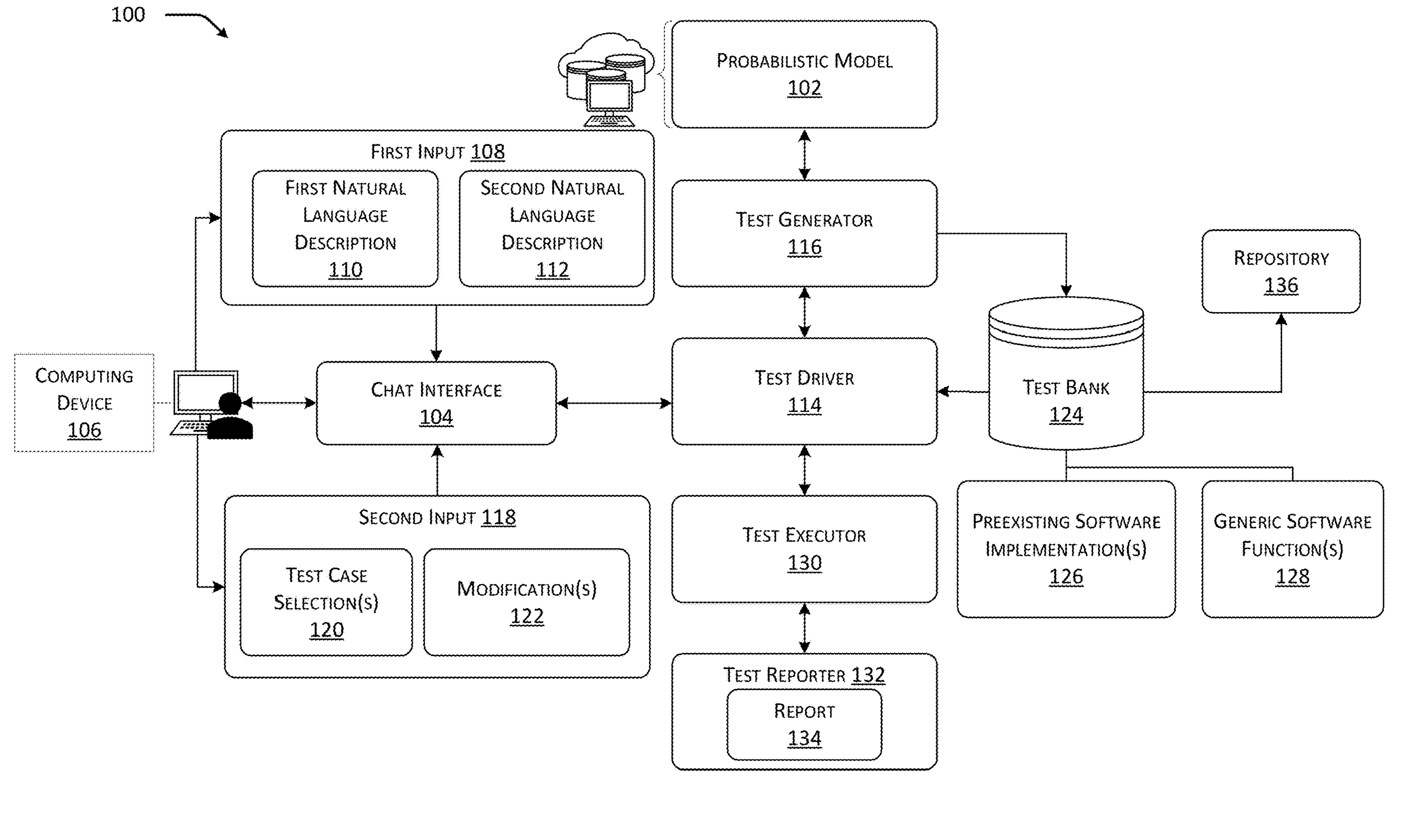
FIG. 1 is a block diagram of a system for automated generation and implementation of software test cases.

FIG. 1 illustrates a system 100 in which a user interacts with a probabilistic model 102 via a chat interface 104 at a computing device 106 associated with the user (e.g., a laptop) and via other additional components described herein. As mentioned above, the probabilistic model 102 can be any general-purpose generative artificial intelligence (AI) model, such as a large language model, that supports an individual input modality and/or any combination of input modalities (e.g., text, image, audio). Examples of large language models include GPT-4 by OPENAI, LAMDA by GOOGLE, and LLAMA by META. In addition, the chat interface 104 is a natural language interface displayed at the computing device 106 that enables a user to interact with the probabilistic model 102 such as a command-line interface, a web page, and the like.

In the example of FIG. 1, a user may wish to generate test cases for a software feature they have developed. Accordingly, the user can initiate the process by providing a first input 108 to the chat interface 104. The first input 108 can include a first natural language description 110 that identifies the software feature and defines an expected functionality of the software feature. In a specific example, the first natural language description 110 can state that the software feature is an interactable element of a graphical user interface (GUI) in a web browser. Furthermore, a second natural language description 112 can provide use cases for the software feature with a process for activating the software feature as well as expected behaviors. In the present example, the second natural language description 112 can state that the interactable element should change color and copy text to the clipboard when clicked. It should be understood that the chat interface 104 can be configured to accept natural language inputs in any suitable format such as text (e.g., typed via a keyboard, transcribed via a microphone), handwritten text (e.g., received or input via a stylus), or speech audio (e.g., via a microphone).

The first input 108 can be provided to a test driver 114. The test driver 114 is a software component that coordinates the passage of information between various components of the system 100 such as the chat interface 104 and the probabilistic model 102. Accordingly, the first input 108 can be subsequently relayed to a test generator 116 for processing. The test generator 116 is a software component that establishes communication with the probabilistic model 102 for generating and implementing software test cases. In various examples, the test generator 116 can accomplish this by integrating an application programming interface (API) service of the probabilistic model 102.

As will be described further below with respect to FIG. 2, the test generator 116 can process the first input 108 to generate a first query for the probabilistic model 102. Accordingly, the first query can cause the probabilistic model 102 to generate a plurality of test cases for the software feature in accordance with the first input 108. In addition, the test generator 116 can include additional information in the first query to provide context to the probabilistic model 102 to constrain the probabilistic model 102 and ensure consistent and high-quality model outputs.

The plurality of test cases can be returned to the test driver 114 and relayed to the chat interface 104 for display on the computing device 106. In response, the user can provide a second input 118 comprising a test case selection 120 and/or a modification 122. For example, the user may review and determine one or more of the generated test cases is satisfactory and wishes to proceed with a test case selection 120. Conversely, the user may determine that one or more of the test cases requires additional information or contains incorrect information which can be remedied with a modification 122.

In response to the second input 118, the test generator 116 can return to the probabilistic model 102 with a second query (illustrated below with respect to FIG. 2) to request a software implementation for each of the one or more test cases identified by the test case selection 120. As with the first query above, the second query can include a contextual input to constrain the probabilistic model 102 and maintain consistency. For instance, the second query can instruct the probabilistic model 102 to utilize a particular programming language. The test generator 116 can subsequently save the software implementations generated by the probabilistic model 102 to a test bank 124. The test bank 124 is a network storage location that houses existing software implementations 126 that can be both manually developed and generated by the probabilistic model 102. As such, the test bank 124 can be accessible to the test driver 114 for performing administrative actions. For instance, the test driver 114 can determine if there is a preexisting software implementation 126 for a given test case such that a user request via the chat interface 104 can bypass the probabilistic model 102. Accordingly, the preexisting software implementation 126 can be provided to the user instead of, or in addition to, generating a new one via the probabilistic model 102. Moreover, the test bank can include generic software functions 128 which can be provided to the probabilistic model 102 for generating software implementations of test cases. In this way, the system 100 can ensure consistent and predictable outputs from the probabilistic model 102.

In addition to saving a new software implementation to the test bank 124, the test generator 116 can pass the software implementation to a test executor 130. The test executor 130 is a software component that compiles and runs the software implementation to execute test case commands. For example, considering the interactable element mentioned above, the associated test case and software implementation may involve opening a web browser session, navigating to the interactable element, activating the interactable element and observing its behavior. Furthermore, the test executor 130 can capture log data that records the results of the test execution.

The log data can be accordingly processed by a test reporter 132 to generate a report 134 for review by the user. The test reporter 132 is a software component that takes in log data and generates a human readable report 134 visualizing the results defined by the log data. In various examples, the test reporter 132 can be configured to utilize suitable output formats such as JAVASCRIPT Object Notation (JSON) or HyperText Markup Language (HTML). The report 134 can then be relayed back to the chat interface 104 by the test driver 114 for review by the user. If the test execution resulted in failures, the report 134 can provide clarity on the conditions that caused the failure due to the well-defined test cases generated by the probabilistic model 102. As such, the user can quickly identify faults in source code and apply fixes.

The user can then submit the software feature source code to a repository 136 for integration and/or deployment. Likewise, the test cases and/or software implementation generated by the probabilistic model 102 can be submitted along with the software feature. In this way, other users such as fellow developers and collaborators that have access to the same source code can gain visibility on the functionality of the software feature. Moreover, other users can view and execute the same or similar software tests to replicate and validate results and/or aid in investigations should additional faults arise at a later point in time.

Figure 2:
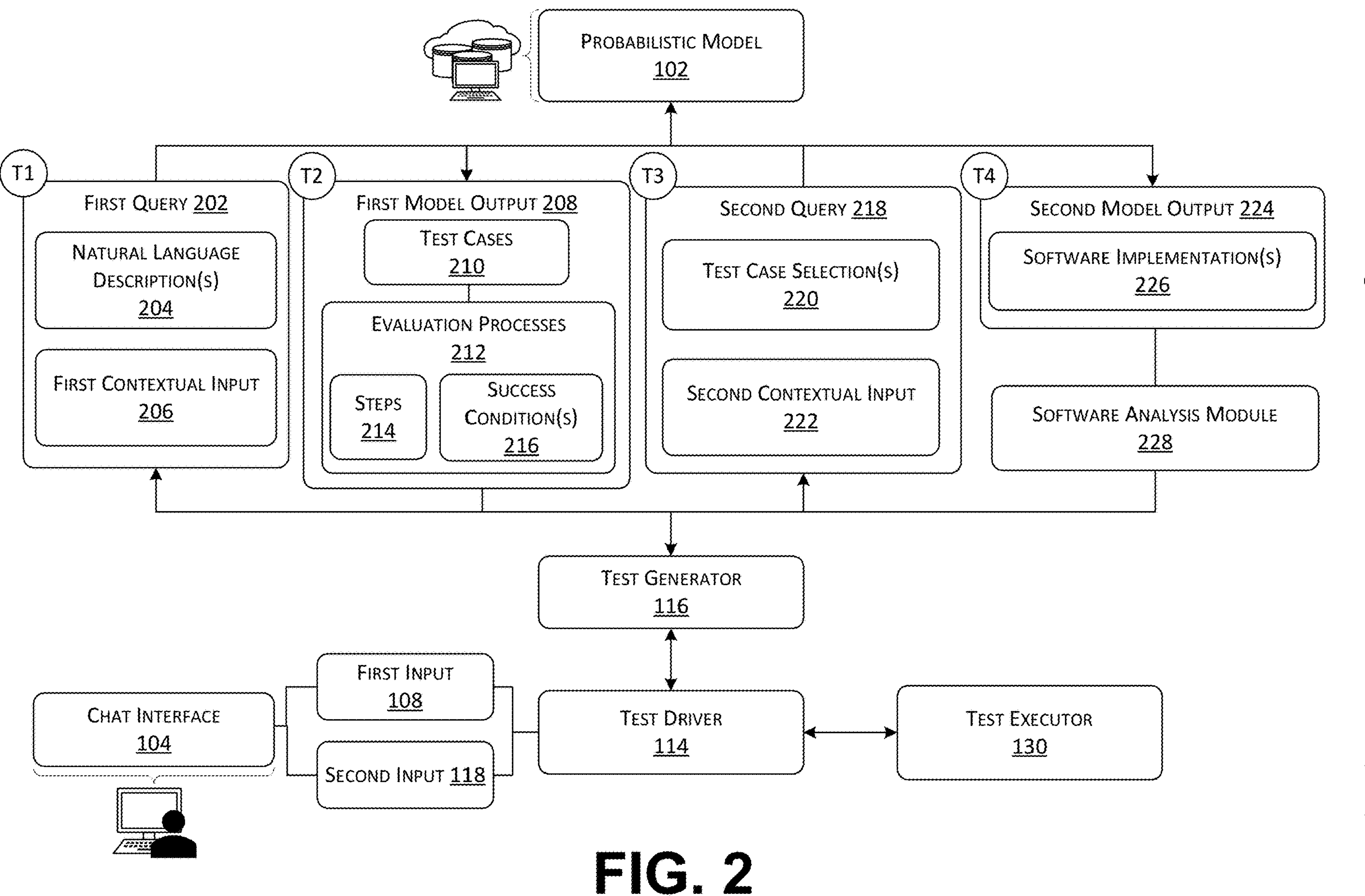
FIG. 2 is a block diagram illustrating additional technical details of the system for automated generation and implementation of software test cases.

Proceeding to FIG. 2, additional details regarding the interaction between the test generator 116 and the probabilistic model 102 are shown and described. As mentioned above, the test generator can communicate with the probabilistic model 102 utilizing model queries (e.g., prompts) and can subsequently process model outputs. For instance, as shown in FIG. 2, the test driver 114 can receive a first input 108 from a chat interface 104 as described above with respect to FIG. 1. The test generator 116 can accordingly process the first input 108 at time T1 to generate a first query 202 that instructs the probabilistic model 102 to generate a plurality of test cases for a software feature. The first query 202 can include user-generated natural language descriptions 204 of a software feature to be tested such as the first natural language description 110 and the second natural language description 112 discussed above.

In addition, to ensure consistent and high-quality outputs from the probabilistic model 102, the test generator 116 can also configure the first query 202 with a first contextual input 206. As will be elaborated upon below, the first contextual input 206 can include an example test case to provide the probabilistic model 102 with an expected test case output. In various examples, the first contextual input 206 can configure the probabilistic model 102 with an output format such that the output generated by the probabilistic model 102 in response to the first query 202 conforms to the output format. The example test case provided by the first contextual input 206 can also configure the probabilistic model 102 with an expected level of detail. For instance, the probabilistic model 102 can mimic the verbiage of the example test case when generating test cases for the software feature specified by the natural language descriptions 204. In this way, the first contextual input 206 can constrain the probabilistic model 102 to maintain consistent and relevant test case outputs.

In response to the first query 202, the probabilistic model 102 can, at time T2, generate a first model output 208 comprising a plurality of test cases 210 where different test cases of the plurality of test cases 210 can each target an aspect of the expected functionality of the software feature. Each of the test cases 210 can accordingly define an associated evaluation process 212 comprising a set of steps 214 and success conditions 216. A step 214 includes any independent action that is carried out during execution of the evaluation process 212. Moreover, a success condition 216 is an observable and quantifiable behavior of the software feature when executing the evaluation process 212. For instance, given the interactable element mentioned above, a first test case can include an evaluation process 212 that verifies that the interactable element successfully copies a string of text to a clipboard when activated by a user selection (e.g., a click) where the success condition 216 is verifying that the expected string is present in the clipboard. Similarly, a second test case can include an evaluation process 212 that verifies that the interactable element changes its appearance in response to the user selection where the success condition 216 is detecting an expected change in appearance (e.g., color, text).

The first model output 208 can be subsequently processed by the test generator 116 and relayed to the test driver 114 which can, in turn, display the first model output 208 at the chat interface 104 for review by a user. As discussed above, the user can select one or more of the test cases for implementation by the probabilistic model 102 via the chat interface 104 to generate a second input 118. The second input 118 can be relayed to the test generator 116 for processing. In response to the second input 118, the test generator 116 can, at time T3, generate a second query 218 to instruct the probabilistic model 102 to generate a software implementation of the test cases identified by the test case selection 220 (e.g., test case selection 120 in FIG. 1) of the second input 118.

As with the first query 202, the second query 218 can include a second contextual input 222 that constrains the probabilistic model 102 and ensures consistent outputs. In the present example, the second contextual input 222 can provide boilerplate code to generate the requested software implementation such as the generic software functions 128 discussed above. By providing the boilerplate code, the second contextual input 222 can configure the probabilistic model 102 to utilize a specific programming language (e.g., JAVASCRIPT) that is appropriate for the context of the software test. That is, if unconstrained by the second contextual input 222, the probabilistic model 102 may implement the software test in an incompatible programming language. Moreover, by providing a restricted set of programming tools such as the generic software functions 128, the second contextual input 222 can ensure a minimum level of program optimality for test case implementations. Stated another way, if given free reign, the probabilistic model 102 may implement the test case in an inefficient and/or poorly optimized manner. As such, constraining the choices available to the probabilistic model 102 can prevent unexpected outputs.

Finally, at time T4, the probabilistic model 102 can generate a second model output 224 comprising a software implementation 226 of the one or more test cases identified by the test case selection 220. In some examples, prior to outputting the software implementation 226 to the chat interface 104, the software implementation 226 can be processed by a software analysis module 228 for error checking. If the software analysis module 228 determines that the software implementation 226 is free of syntactical errors, the software implementation 226 can be relayed to the chat interface 104 by the test generator 116 and the test driver 114 for final approval by the user. Upon approval, the software implementation 226 can be run by the test executor 130 to perform the evaluation process 212 defined by the test case 210.

Furthermore, while the examples discussed herein are directed to user inputs provided via a chat interface 104, it should be understood that the automated test case generation and implementation process can be initiated and executed in any suitable manner. In a specific example, the disclosed system can utilize a custom software component for a software development environment such as a plugin. Accordingly, rather than producing a natural language description of the software feature via the chat interface, the user can activate the plugin to create an automated task (e.g., a work item) to extract and provide the natural language description to the probabilistic model 102.

In addition, the plugin can receive the first module output 208 including the plurality of test cases 210 and generate an additional automated task (e.g., a child work item) for each of the test cases 210 to request a corresponding software implementation of the associated test case 210. In one example, an additional automated task can generate the second query 218 to cause the probabilistic model 102 to generate a software implementation 226. Conversely, the disclosed system can check if the additional automated task already exists via an identification number (e.g., a SHA-256 checksum). As such, the system can prevent the generation of duplicate software implementations 226. In various examples, the automated tasks and or additional automated tasks can comprise default (e.g., placeholder) software tests which can accordingly include the steps defined by the corresponding test case 210. It should be understood that such a plugin can be activated via any suitable user input method and/or accessibility technology such as text (e.g., typed via a command line interface), a voice command, a visual input (e.g., a user's gaze captured by a camera), and so forth.

Figure 3A:
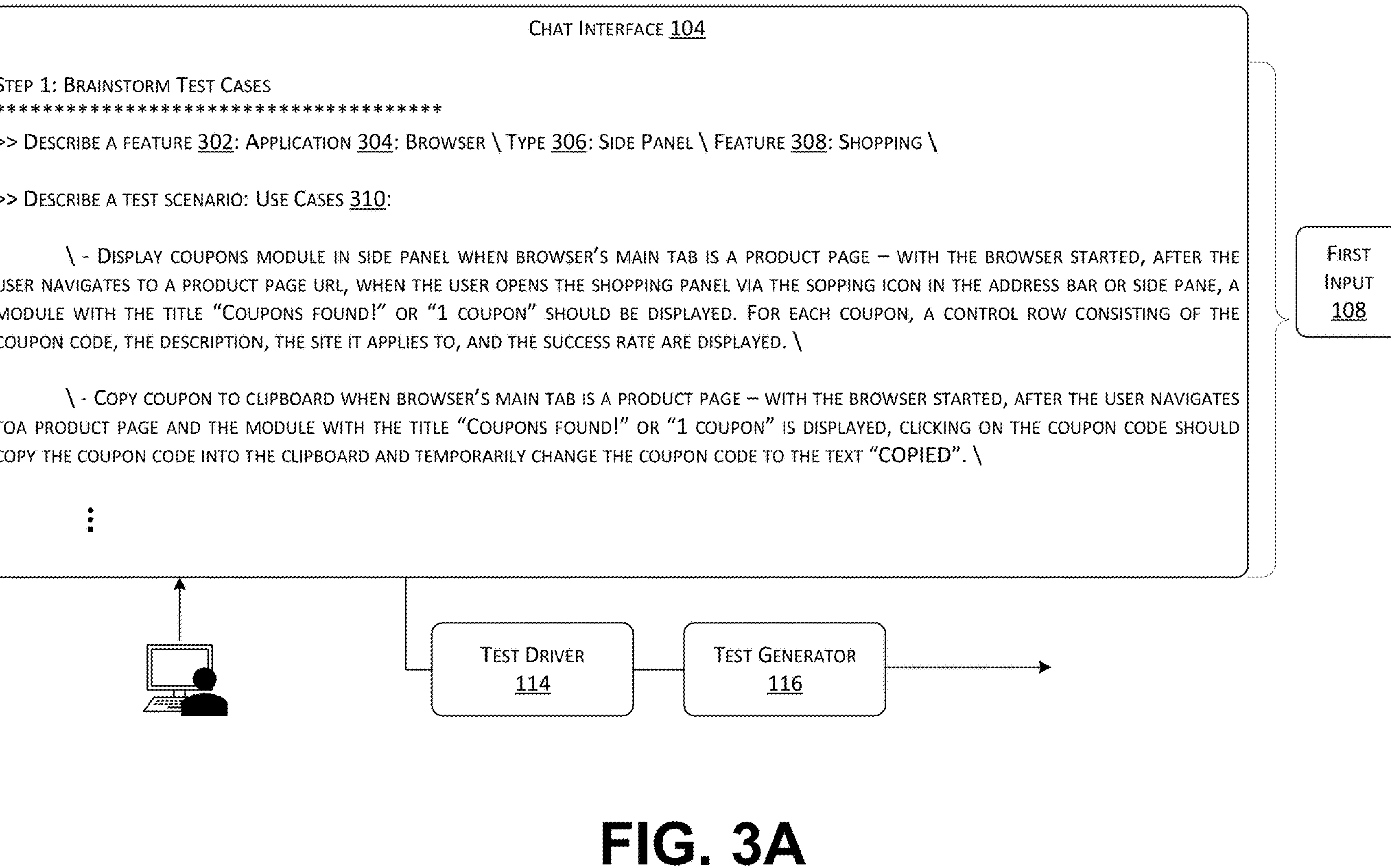
FIG. 3A illustrates an example chat interface for interacting with the system for automated generation and implementation of software test cases in a phase of operation in which a user provides a description of a software feature to be tested.

Turning now to FIG. 3A, aspects of an example interaction with the probabilistic model 102 via that chat interface 104 are shown and described. As described above, a user can initiate test case generation by providing the chat interface 104 with a first input 108 comprising a first natural language description of a software feature and a second natural language description defining a process for activating the software feature. As shown in FIG. 3A, the first natural language description 302 can comprise a set of identifications such as an application 304 to which the software feature belongs, a feature type 306, and the name of the feature 308 itself. In this way, the software feature 308 can be readily identified from the first natural language description 302, especially in enterprise contexts when a single application 304 can contain hundreds or even thousands of features 308. In the present example, the software feature 308 is a side panel of a web browser user interface that enables a user to take advantage of coupons when shopping online.

In addition, the user can provide a second natural language description defining a process for activating various aspects of the software feature 308 and/or expected behaviors of the software feature 308. The second natural language description is referred to in this example as use cases 310. For example, a first use case 310 can state that, when the main tab of the web browser is a product page, the shopping side panel should display a module with available coupons. Moreover, each available coupon should be accompanied by a control row consisting of the coupon code, a description of the coupon, the site the coupon applies to, and a success rate of the coupon. Another use case 310 can state that clicking on the coupon code should copy the coupon code to the clipboard and temporarily change the displayed coupon code to "COPIED" to indicate that the user has copied the coupon code. Accordingly, the first input 108 can be submitted and relayed to the test generator 116 by the test driver 114 for processing. It should be understood that the first input 108 can contain any number of use cases 310 and can be formatted in any suitable manner such as text and/or audio.

Figure 3B:
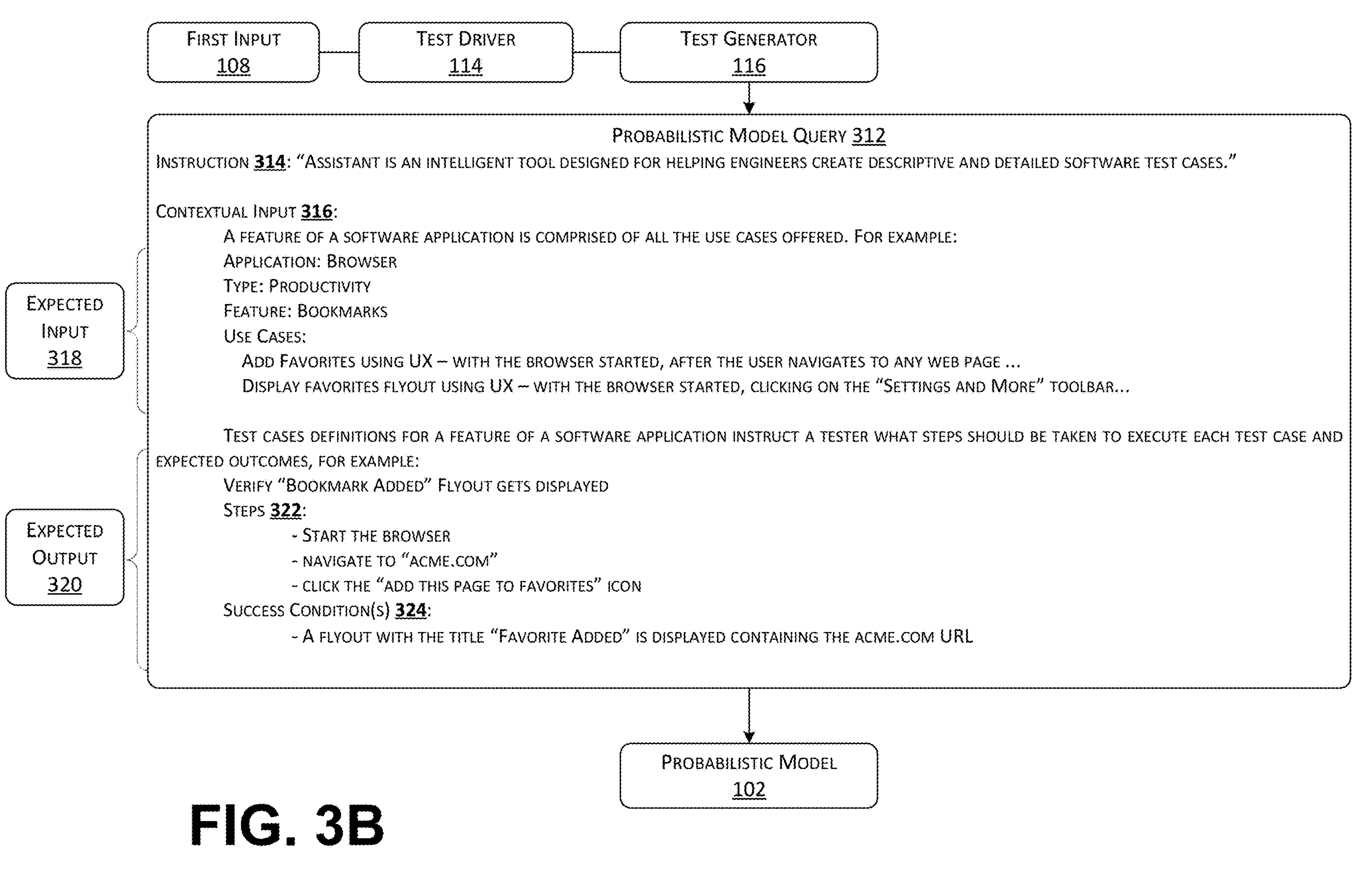
FIG. 3B illustrates an example of a probabilistic model query requesting a plurality of software test cases.

Proceeding to FIG. 3B, an example of a probabilistic model query 312 is shown and described. Generally described, the probabilistic query 312 is any input to a probabilistic model 102 that defines a task to be completed and provides context utilizing an expected input and expected output that constrains the probabilistic model 102 and ensures predictable, consistent model outputs. In various examples, instances of a probabilistic model query 312 include the first query 202 and the second query 218 discussed above. As discussed above with respect to FIG. 2, the test generator 116 can receive a first input 108 comprising user generated natural language descriptions of a software feature and a process for activating various aspects of the software feature. In response, the test generator 116 can produce a probabilistic model query 312 that includes an instruction 314 and a contextual input 316. In various examples, the instruction 314 can be a natural language statement that configures a probabilistic model 102 to accomplish a task defined by the instruction 314. For example, as shown in FIG. 3B, the instruction 314 can state that the probabilistic model 102 is an "assistant" and "an intelligent tool designed for helping engineers create descriptive and detailed software test cases." In this way, the probabilistic model 102 can generally infer a general expected behavior based on the instruction 314.

In addition, the expected behavior of the probabilistic model 102 can be further defined by the contextual input 316 utilizing an expected input 318 and an expected output 320. In various examples, the contextual input 316 can be the first contextual input 206 discussed above. As shown in FIG. 3B, the contextual input 316 can provide a definition of a software feature as "comprised of all the use cases offered." The contextual input 316 can accordingly provide an example of a software feature description as the expected input 318 defining a bookmarks feature in a web browser with use cases illustrating various behaviors of the feature. In this way, the expected input 318 can configure the probabilistic model 102 with an expected format and content for the first input 108. As such, the probabilistic model 102 can efficiently parse the first input 108.

Moreover, the contextual input 316 can include an expected output 320 that defines an expected format and content of a software test case. For instance, the expected output 320 can include a statement defining a test case as "instruct[ing] a test what steps should be taken to execute each test case and expected outcomes." Accordingly, the expected output 320 can provide an example of a test case ("verify 'bookmark added' flyout gets displayed) comprising a series of steps 322 to activate the software feature and an associated success condition 324 that defines an expected behavior of the software feature. Subsequently, the first input 108, the expected input 318, and the expected output 320 can be provided to the probabilistic model 102 as the probabilistic model query 312.

Figure 3C:
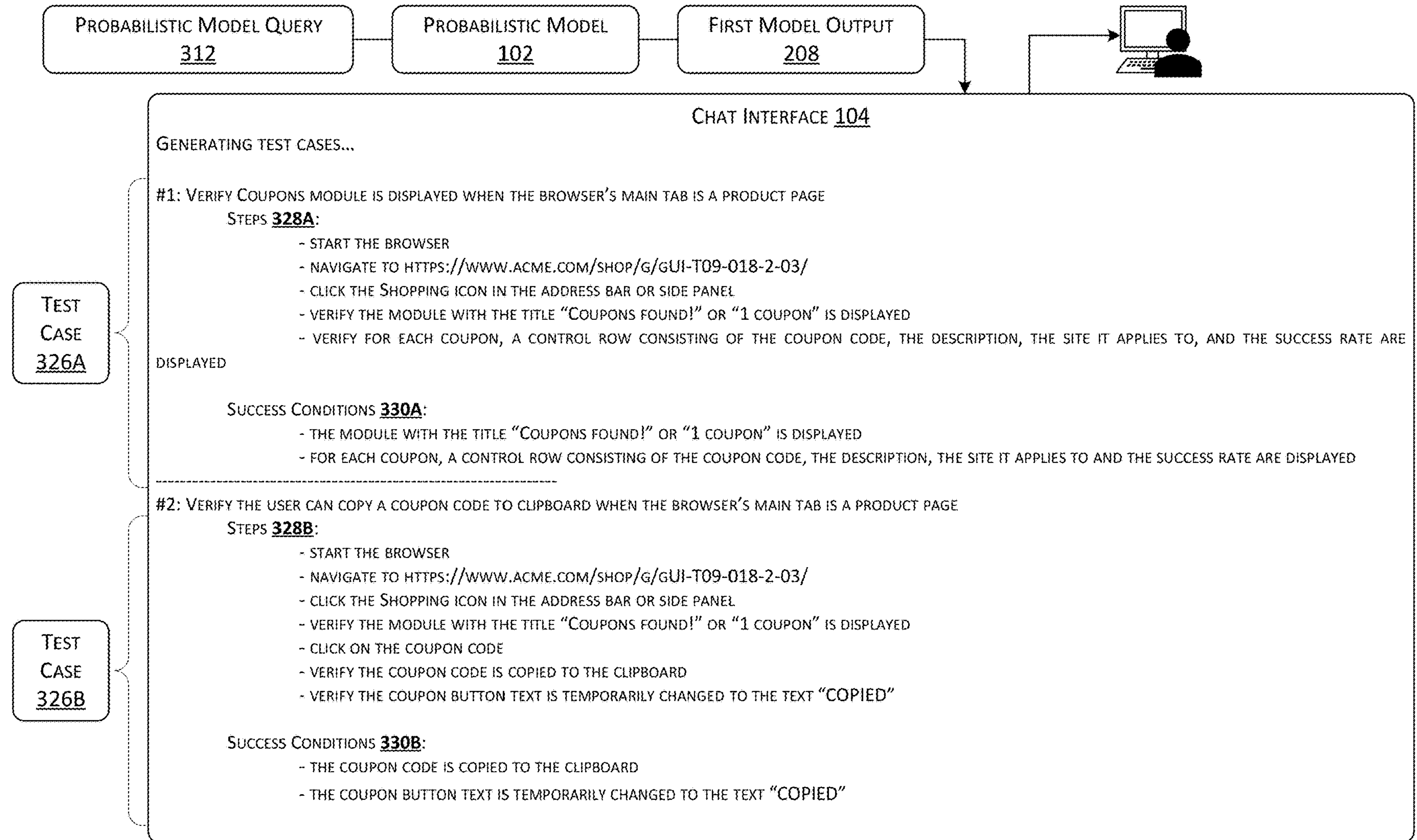
FIG. 3C illustrates an example chat interface for interacting with the system for automated generation and implementation of software test cases in a phase of operation in which a user is presented with generated software test cases.

Turning now to FIG. 3C, an example of a plurality of software test cases 326A and 326B generated by a probabilistic model 102 in response to a probabilistic model query 312 are shown and described. As discussed above, the contextual input 316 of the probabilistic model query 312 can configure the probabilistic model 102 with an output format when generating the first model output 208. As shown, the test cases 326A and 326B can mimic the output format of the example test case where each test case 326A and 326B can include a respective series of steps 328A and 328B and success conditions 330A and 330B.

As discussed above with respect to FIG. 3A, the software feature identified by the first input 108 can be a coupon module of a side panel for online shopping in a web browser. Accordingly, the generated test cases 326A and 326B can define respective sequences of steps 328A and 328B to activate various aspects of the coupon module. For example, the first test case 326A can be configured with steps 328A to "verify that the coupons module is displayed when the browser's main tab is a product page." Accordingly, the success conditions 330A can relate to observing that the coupon module is displayed with the expected content (e.g., the coupon code, the applicable site, the success rate). Likewise, the second test case 326B can be configured with steps 328B to "verify that the user can copy a coupon code to clipboard when the browser's main tab is a product page" and success conditions 330B that relate to verifying that the coupon code is successfully copied, and that the appearance of the coupon button changes appearance in response. Furthermore, the test cases 326A and 326B can be displayed in the chat interface 104 for review by a user (e.g., a software engineer). It should be understood that the test cases 326A and 326B are brief examples of test cases and that the probabilistic model 102 can be configured to generate any number of test cases comprising any number of steps and/or success conditions for any software feature.

Figure 4A:
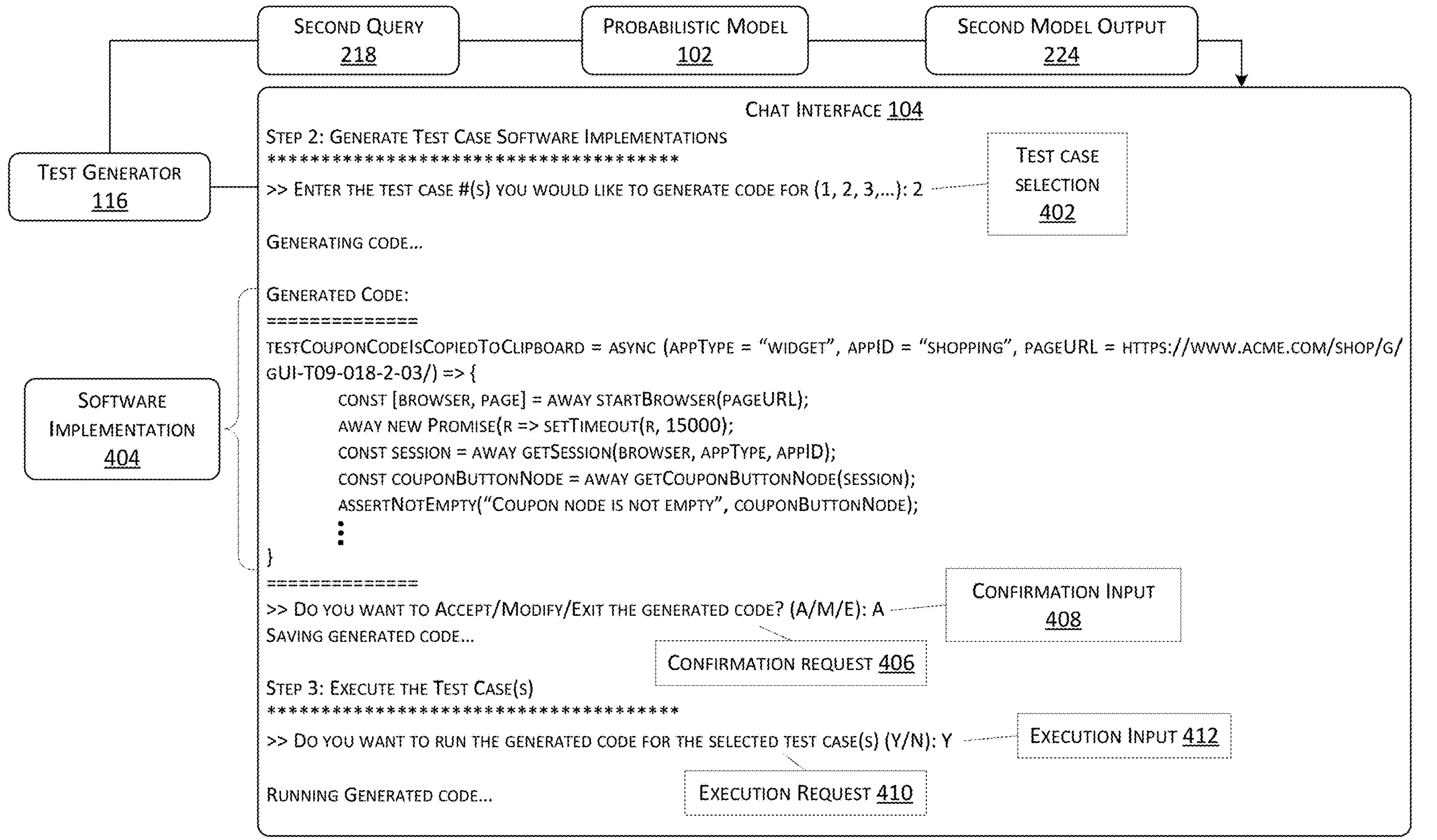
FIG. 4A illustrates an example chat interface for interacting with the system for automated generation and implementation of software test cases in a phase of operation in which a user selects a software test case for implementation.

Proceeding to FIG. 4A, after reviewing the generated test cases 326A and 326B within the chat interface 104, the user can provide a test case selection 402 identifying one or more of the test cases 326 to be implemented by the probabilistic model 102. In response, the test generator 116 can produce a second probabilistic model query 218. As discussed above, the second probabilistic model query 218 can define a task to be completed by the probabilistic model 102 and include context utilizing an expected input and expected output. In the present example, the second probabilistic model query 218 can include an instruction that configures the probabilistic model 102 to generate a software implementation of the one or more test cases identified by the test case selection 402. In addition, the second probabilistic model query 218 can include an example software implementation of a test case as well as generic software functions as mentioned above. In this way, the probabilistic model 102 can be configured to utilize a specific programming language as well as a well-defined set of software tools to implement the test case.

The second probabilistic model query 218 can accordingly be provided to the probabilistic model 102 which can generate a second model output 224 comprising a software implementation 404 in response. Accordingly, the software implementation 404 can be displayed in the chat interface 104 for review by a user. In the present example, the test case can be a user interface test evaluating a coupon module as discussed above with respect to FIG. 3C. Specifically, the selected test case (test case #2), can verify that the user can copy a coupon code to the clipboard when the main tab of a browser is a product page. Accordingly, the software implementation 404 can comprise a series of commands that manipulate the graphical user interface of a web browser in accordance with the steps 328B defined by the test case 326B. Moreover, the software implementation 404 can include programmatic definitions (e.g., asserts) of the success conditions 330B defined by the test case 326B.

The software implementation 404 can be subsequently displayed in the chat interface 104 along with a confirmation request 406 requesting a user input accept or reject and/or modify the software implementation 404. Upon reviewing the software implementation 404, the user can provide a confirmation input 408. In the present example, the confirmation input 408 ("A") accepts the software implementation 404 as generated by the probabilistic model 102. In an alternative example, the confirmation input 408 can elect to modify ("M") the software implementation 404 in which the user can provide changes to the software implementation 404. In another example, the confirmation input 408 can simply exit ("E") and wholly reject the software implementation 404. In response to the confirmation input, the chat interface 104 can display an execution request 410. Accordingly, the user can provide an execution input 412 to initiate execution of the software implementation 404.

Figure 4B:
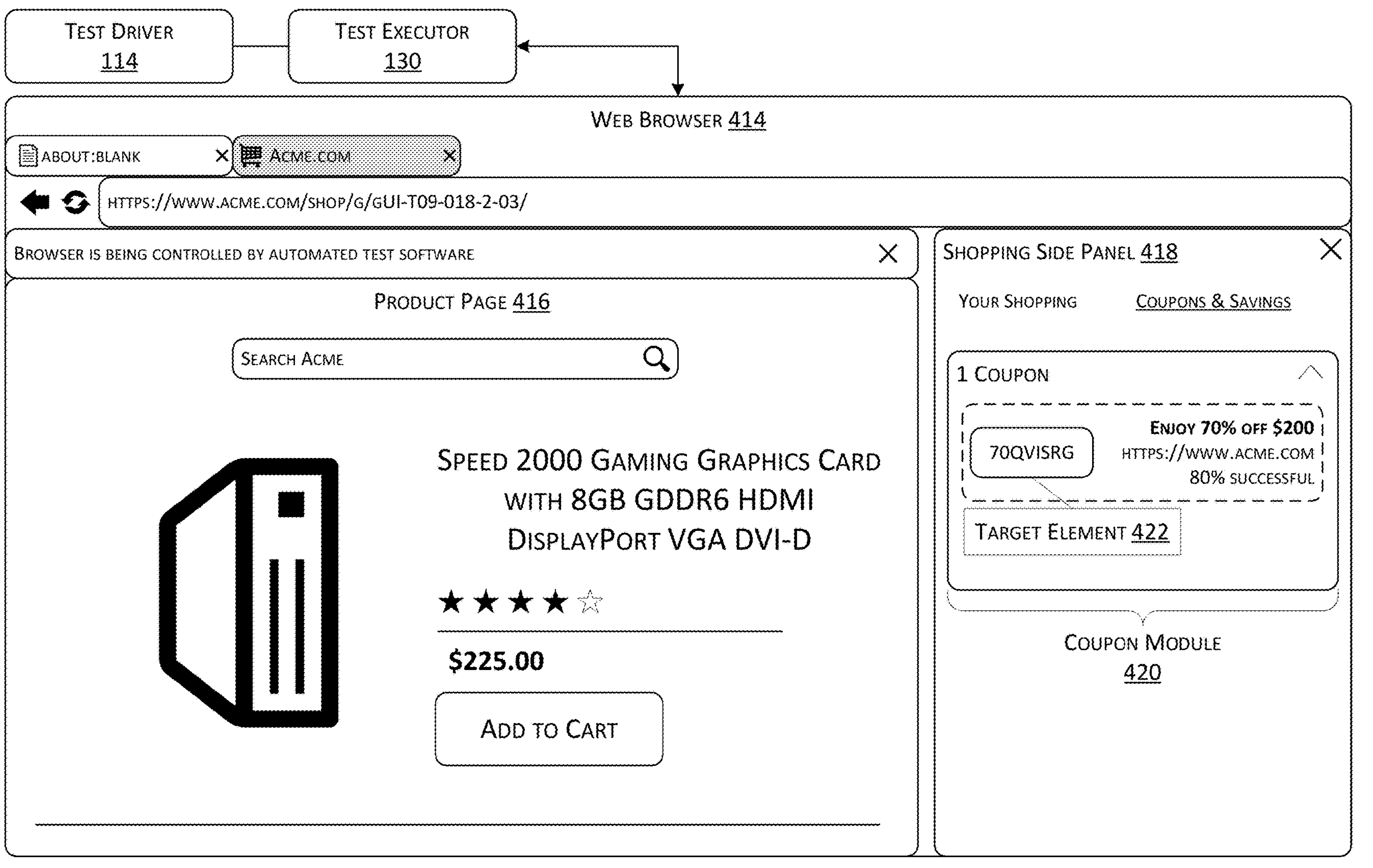
FIG. 4B illustrates an example software test in a first phase of execution.

Turning now to FIG. 4B, in response to the execution input, the test driver 114 can relay the software implementation to the test executor 130. Accordingly, the test executor 130 can execute the software implementation 404 by opening an instance of a web browser 414 and navigating to a product page 416. In response, the web browser 414 can display a shopping side panel 418 containing a coupon module 420. In addition, the test executor 130 can identify a target element 422. In the present example, the current software test case evaluates copying the coupon code to the clipboard. Consequently, the target element 422 can be a portion of the coupon module displaying the coupon code ("70QVISRG").

Figure 4C:
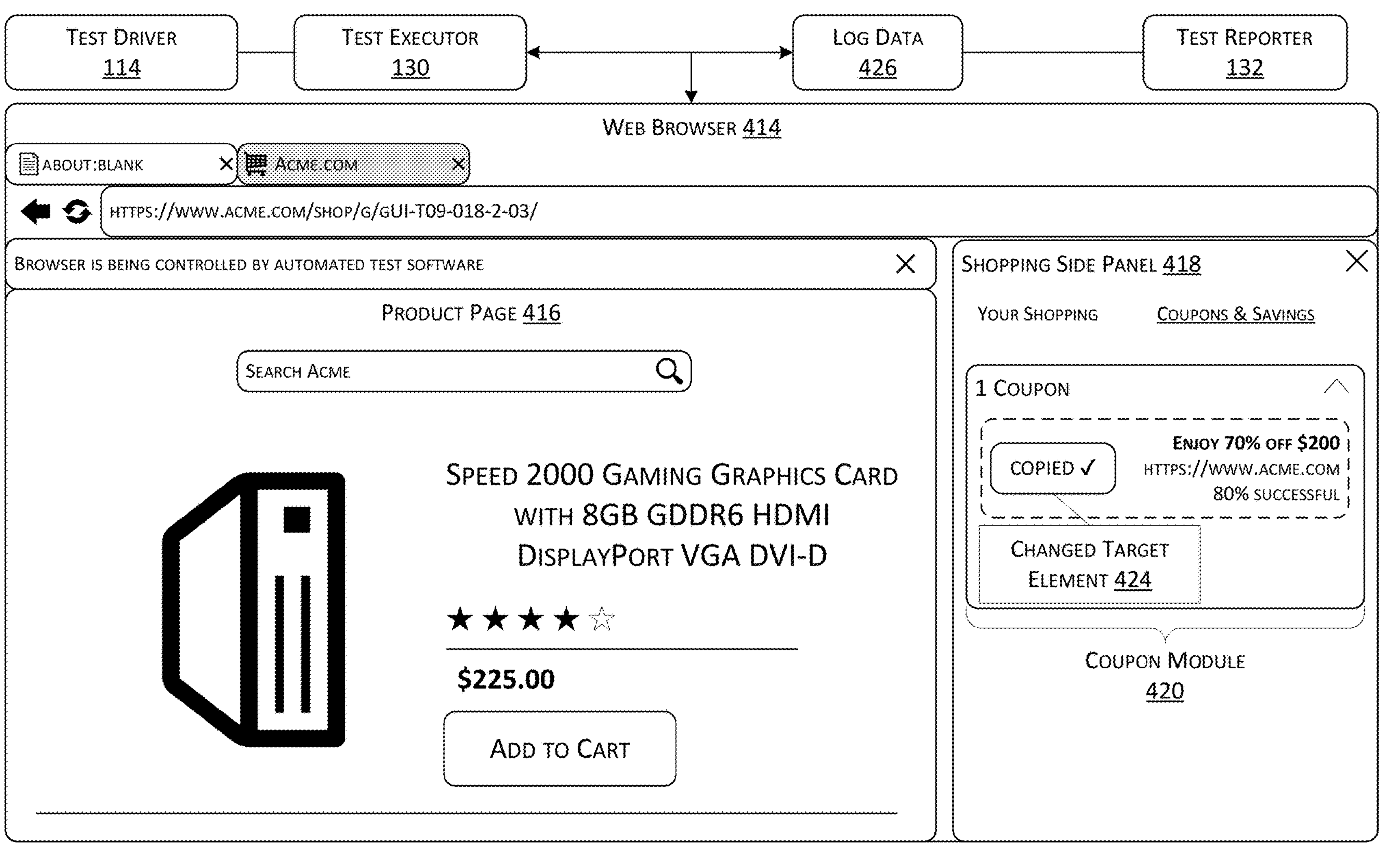
FIG. 4C illustrates an example software test in a second phase of execution.

Proceeding to FIG. 4C, the test executor 130 can perform a command of the software implementation 404 that activates (e.g., clicks) the target element 422. In response, the target element 422 can become a changed target element 424 displaying a "COPIED" message temporarily before returning to the coupon code. Accordingly, the test executor 130 can conclude the software test. Moreover, the test executor 130 can extract log data 426 from the testing environment web browser 414 during and after the execution of the software implementation 404. In various examples, the log data 426 can record events that occurred during execution of the software test and, as such, define an outcome of the software test. In a specific example, the log data 426 can correspond directly to the programmatic definitions (e.g., asserts) of success conditions within the software implementation 404. The log data 426 can be passed along to a test reporter 132 for processing as a test results report. It should be understood that the web browser 414 is merely an example of a testing environment and that executing a software test can involve any number of software applications and/or commands.

Moreover, the log data 426 can be extracted at any point during the execution of the software test to continuously monitor performance. In one example, the test executor 130 can determine during a test that the log data 426 does not match a success condition. In response, the test executor 130 can immediately terminate the software test. Furthermore, the log data 426 can be formatted in any suitable format. In a specific example, in the context of user interface testing, the log data 426 can be an image capturing a current state of the user interface. Accordingly, the image of the log data 426 can be analyzed (e.g., by the probabilistic model 102) to determine whether the current state of the user interface matches an expected state.

Figure 4D:
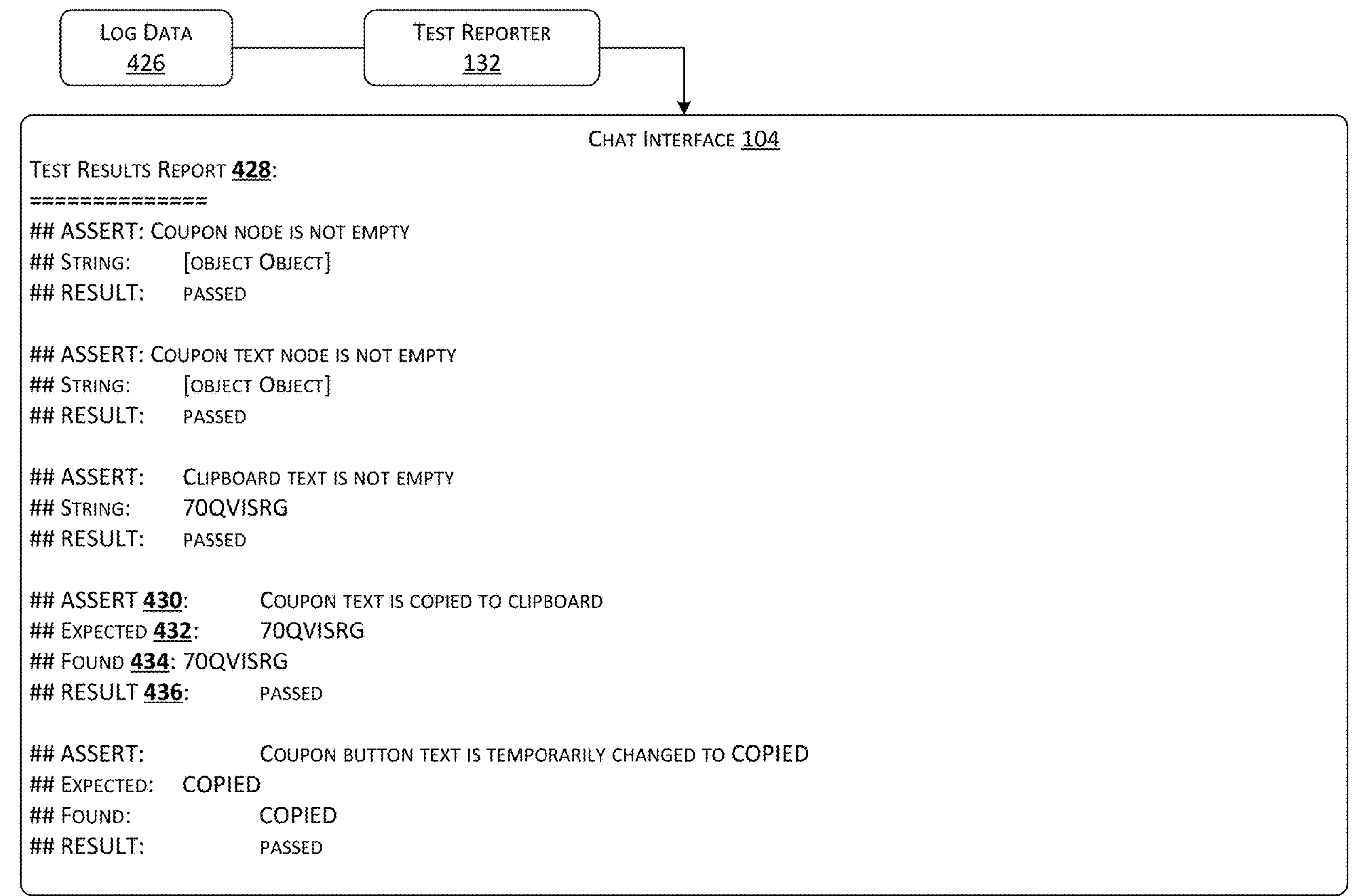
FIG. 4D illustrates an example chat interface displaying the results of a software test execution.

Turning now to FIG. 4D, an example display of a test results report 428 derived from the log data 426 is shown and described. As discussed, the test reporter 132 can process the log data 426 to generate a test results report 428 for review by a user (e.g., a software engineer). In various examples, the test reporter 132 can format the test results report in various formats such as JAVASCRIPT Object Notation (JSON) and Hypertext Markup Language (HTML) for compatibility with data processing and visualization systems. In the present example, the test results report 428 is displayed in the chat interface 104. Accordingly, the test results report 428 can enumerate each success condition (e.g., "assert") defined by the software implementation 404 and the ultimate result based on the log data 426. For instance, an assert 430 can be directed to verifying that the correct coupon text is copied to the clipboard.

Moreover, an individual assert 430 as displayed can include an expected value 432 and a found value 434 that was observed during the execution of the software implementation 404 and recorded in the log data 426. By comparing the found value 434 recorded in the log data 426 against the expected value 432 defined in the software implementation 404, the test reporter 132 can classify each portion of the software test as a success (e.g., "PASSED"). In this way, a user can quickly view how various aspects of the software test transpired and gain visibility in the event any of the results 436 are classified as a failure (e.g., "NOT PASSED"). It should be understood that the test results report 428 can be formatted and/or displayed in any suitable format based on a user's preference such as a table, an informational graphic, a data plot, and the like, Proceeding to FIGS. 5A and 5B, aspects of a process 500 for automated generation and implementation of software test cases are shown and described. With respect to FIG. 5, the process 500 begins at operation 502 in which a system receives a first user input including a first natural language description defining an expected functionality of a software feature and a second natural language description defining a process for activating the software feature.

Next, at operation 504, the system generates a first probabilistic model query based on the first natural language description and the second natural language description including a first contextual input defining an expected test case output.

Then, at operation 506, the system causes, by the first probabilistic model query, a probabilistic model to generate a first model output comprising a plurality of test cases for the software feature in accordance with the first contextual input, an individual test case defining a process for evaluating an aspect of the expected functionality of the software feature.

Figure 5B:
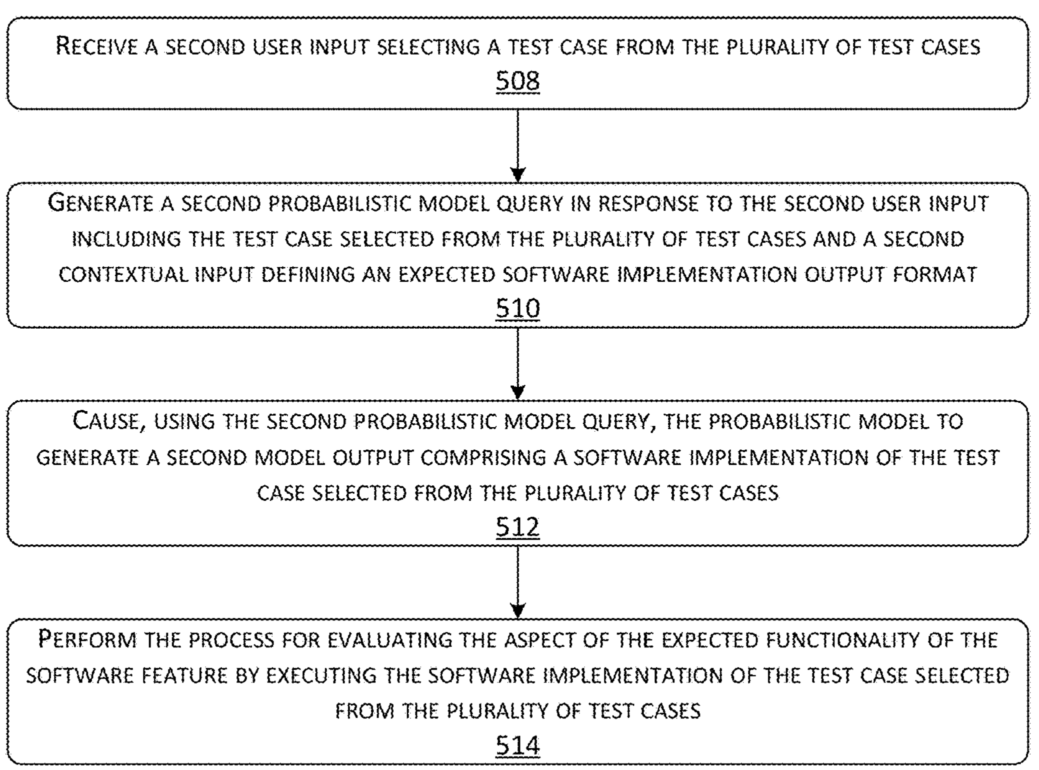
FIG. 5B is a flow diagram showing aspects of a process for automated software test implementation using a natural language chat interface and a probabilistic model.

Turning to FIG. 5B, the process 500 continues at operation 508 where the system receives a second user input selecting a test case from the plurality of test cases.

Subsequently, operation 510 where the system generates a second probabilistic model query in response to the second user input including the test case selected from the plurality of test cases and a second contextual input defining an expected software implementation output.

Next, at operation 512, the system causes, by the second probabilistic model query, the probabilistic model to generate a second model output comprising a software implementation of the test case selected from the plurality of test cases.

Finally, at operation 514, the system performs the process for evaluating the aspect of the expected functionality of the software feature by executing the software implementation of the test case selected from the plurality of test cases.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the process 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the process 500 may also be implemented in other ways. In addition, one or more of the operations of the process 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
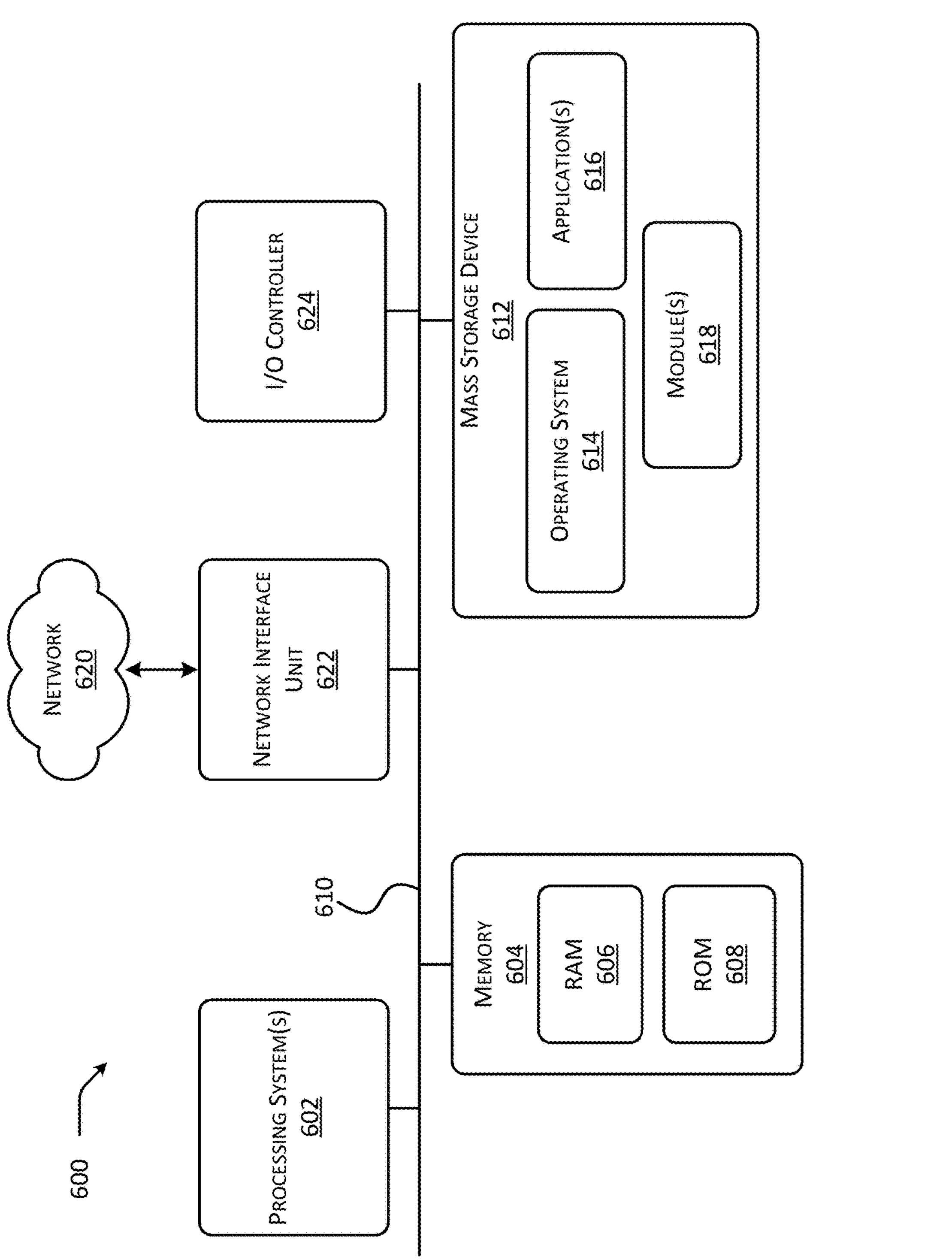
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the system 100, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location. For example, the processing system 602 can include graphical processing units (GPUs) for executing complex artificial intelligence applications such as large language models. Moreover, the systems discussed herein can be provided as a distributed computing system such as a cloud service.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 610, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method comprising: receiving a first user input including a first natural language description defining an expected functionality of a software feature and a second natural language description defining a process for using the software feature; generating a first probabilistic model query based on the first natural language description and the second natural language description including a first contextual input defining an expected test case output format; causing, using the first probabilistic model query, a probabilistic model to generate a first model output comprising a plurality of test cases for the software feature in accordance with the first contextual input, an individual test case defining a process for evaluating an aspect of the expected functionality of the software feature; receiving a second user input selecting a test case from the plurality of test cases; generating a second probabilistic model query in response to the second user input including the test case selected from the plurality of test cases and a second contextual input defining an expected software implementation output format; causing, using the second probabilistic model query, the probabilistic model to generate a second model output comprising a software implementation of the test case selected from the plurality of test cases; and performing the process for evaluating the aspect of the expected functionality of the software feature by executing the software implementation of the test case selected from the plurality of test cases.

Example Clause B, the method of Example Clause A, wherein the process for evaluating the associated function includes a success condition defining an expected outcome of the process.

Example Clause C, the method of Example Clause B, wherein the executing the software implementation comprises: extracting log data defining an outcome of the execution of the software implementation; comparing the log data against the success condition; and classifying the execution of the software implementation based on the comparison of the log data against the success condition.

Example Clause D, the method of any one of Example Clause A through C, further comprising: detecting a preexisting software implementation of the test case selected from the plurality of test cases in a software test bank; extracting the preexisting software implementation from the software test bank; and including the preexisting software implementation in the second model output.

Example Clause E, the method of any one of Example Clause A through D, further comprising: processing a software syntax of the software implementation of the test case selected from the plurality of test cases; determining that the software implementation is free of syntactical errors; and in response to determining that the software implementation is free of syntactical errors, enabling the execution of the software implementation.

Example Clause F, the method of any one of Example Clause A through E, wherein the second contextual input defining the expected software implementation output comprises generic software functions for performing an associated test case.

Example Clause G, the method of Example Clause F, wherein the generic software functions comprise automated commands for manipulating a graphical user interface.

Example Clause H, a system comprising: a processing system; and a computer readable medium storing instructions that, when executed by the processing system, cause the system to perform operations comprising: receiving a user input including a first natural language description defining an expected functionality of a software feature and a second natural language description defining a process for using the software feature; generating a probabilistic model query based on the first natural language description and the second natural language description including a contextual input defining an expected test case output format; and causing, using the probabilistic model query, a probabilistic model to generate a model output comprising a plurality of test cases for the software feature in accordance with the contextual input, an individual test case defining a process for evaluating an aspect of the expected functionality of the software feature.

Example Clause I, the system of Example Clause H, wherein: the user input is a first user input; the probabilistic model query is a first probabilistic model query; the contextual input is a first contextual input; the model output is a first model output; and the operations further comprise: receiving a second user input selecting a test case from the plurality of test cases; generating a second probabilistic model query in response to the second user input including the test case selected from the plurality of test cases and a second contextual input defining an expected software implementation output format; causing, using the second probabilistic model query, the probabilistic model to generate a second model output comprising a software implementation of the test case selected from the plurality of test cases; and performing the process for evaluating the aspect of the expected functionality of the software feature by executing the software implementation of the test case selected from the plurality of test cases.

Example Clause J, the system of Example Clause I, wherein the executing the software implementation comprises: extracting log data defining an outcome of the execution of the software implementation; comparing the log data against the success condition; and classifying the execution of the software implementation based on the comparison of the log data against the success condition.

Example Clause K, the system of Example Clause I or Example Clause J, wherein the operations further comprise: detecting a preexisting software implementation of the test case selected from the plurality of test cases in a software test bank; extracting the preexisting software implementation from the software test bank; and including the preexisting software implementation in the second model output.

Example Clause L, the system of any one of Example Clause I through K, wherein the operations further comprise: processing a software syntax of the software implementation of the test case selected from the plurality of test cases; determining that the software implementation is free of syntactical errors; and in response to determining that the software implementation is free of syntactical errors, enabling the execution of the software implementation.

Example Clause M, the system of any one of Example Clause I through L, wherein the second contextual input defining the expected software implementation output comprises generic software functions for performing an associated test case.

Example Clause N, the system of Example Clause M, wherein the generic software functions comprise automated commands for manipulating a graphical user interface.

Example Clause O, a computer-readable storage medium storing instructions that, when executed by the one or more processing units, cause the system to perform operations comprising: receiving a user input including a first natural language description defining an expected functionality of a software feature and a second natural language description defining a process for using the software feature; generating a probabilistic model query based on the first natural language description and the second natural language description including a contextual input defining an expected test case output format; and causing, using the probabilistic model query, a probabilistic model to generate a model output comprising a plurality of test cases for the software feature in accordance with the contextual input, an individual test case defining a process for evaluating an aspect of the expected functionality of the software feature.

Example Clause P, the computer-readable storage medium of Example Clause O, wherein: the user input is a first user input; the probabilistic model query is a first probabilistic model query; the contextual input is a first contextual input; the model output is a first model output; and the operations further comprise: receiving a second user input selecting a test case from the plurality of test cases; generating a second probabilistic model query in response to the second user input including the test case selected from the plurality of test cases and a second contextual input defining an expected software implementation output format; causing, using the second probabilistic model query, the probabilistic model to generate a second model output comprising a software implementation of the test case selected from the plurality of test cases; and performing the process for evaluating the aspect of the expected functionality of the software feature by executing the software implementation of the test case selected from the plurality of test cases.

Example Clause Q, the computer-readable storage medium of Example Clause P, wherein the executing the software implementation comprises: extracting log data defining an outcome of the execution of the software implementation; comparing the log data against the success condition; and classifying the execution of the software implementation based on the comparison of the log data against the success condition.

Example Clause R, the computer-readable storage medium of Example Clause P or Example Clause Q, wherein the operations further comprise: detecting a preexisting software implementation of the test case selected from the plurality of test cases in a software test bank; extracting the preexisting software implementation from the software test bank; and including the preexisting software implementation in the second model output.

Example Clause S, the computer-readable storage medium of any one of Example Clause P through R, wherein the operations further comprise: processing a software syntax of the software implementation of the test case selected from the plurality of test cases; determining that the software implementation is free of syntactical errors; and in response to determining that the software implementation is free of syntactical errors, enabling the execution of the software implementation.

Example Clause T, the computer-readable storage medium of any one of Example Clause P through S, wherein the second contextual input defining the expected software implementation output comprises generic software functions for performing an associated test case.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different test cases).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

It is claimed:

1. A method comprising:

receiving, via a natural language interface, a first user input including a first natural language description defining an expected functionality of a software feature and a second natural language description defining a process for using the software feature;

generating, based on the first natural language description and the second natural language description, a first probabilistic model query including a first contextual input defining an expected test case output format;

providing the first probabilistic model query to a probabilistic model;

receiving, from the probabilistic model, a first model output comprising a plurality of test cases for the software feature in accordance with the first contextual input defining the expected test case output format, an individual test case defining a sequence of natural language steps for evaluating an aspect of the expected functionality of the software feature;

causing the plurality of test cases, each defining a sequence of natural language steps, to be displayed via the natural language interface for review and selection;

receiving, via the natural language interface, a second user input selecting a test case from the plurality of test cases displayed via the natural language interface;

generating, based on the second user input selecting the test case, a second probabilistic model query and a second contextual input defining an expected software implementation output format;

providing the second probabilistic model query to the probabilistic model;

receiving, from the probabilistic model, a second model output comprising a software implementation of the test case;

causing the software implementation of the test case to be displayed via the natural language interface with a request to confirm the software implementation;

receiving, via the natural language interface, a third user input confirming the software implementation;

executing, based on the third user input confirming the software implementation, the software implementation to perform the sequence of natural language steps, defined by the test case, for evaluating the aspect of the expected functionality of the software feature;

extracting log data defining an outcome of the execution of the software implementation;

comparing the log data against a success condition defining an expected outcome of the sequence of natural language steps, defined by the test case, for evaluating the aspect of the expected functionality of the software feature; and classifying the execution of the software implementation as passed or not passed based on the comparison of the log data against the success condition.

2. The method of claim 1, further comprising:

detecting a preexisting software implementation of the test case in a software test bank;

extracting the preexisting software implementation from the software test bank; and including the preexisting software implementation in the second model output.

3. The method of claim 1, further comprising:

processing a software syntax of the software implementation of the test case;

determining that the software implementation is free of syntactical errors; and in response to determining that the software implementation is free of syntactical errors, enabling the execution of the software implementation.

4. The method of claim 1, wherein the second contextual input defining the expected software implementation output format comprises generic software functions for performing an associated test case.

5. The method of claim 4, wherein the generic software functions comprise automated commands for manipulating a graphical user interface.

6. A system comprising:

a processing system; and a computer readable storage medium storing instructions that, when executed by the processing system, cause the system to perform operations comprising:

receiving, via a natural language interface, a first user input including a first natural language description defining an expected functionality of a software feature and a second natural language description defining a process for using the software feature;

generating, based on the first natural language description and the second natural language description, a first probabilistic model query including a first contextual input defining an expected test case output format;

providing the first probabilistic model query to a probabilistic model;

receiving, from the probabilistic model, a first model output comprising a plurality of test cases for the software feature in accordance with the first contextual input defining the expected test case output format, an individual test case defining a sequence of natural language steps for evaluating an aspect of the expected functionality of the software feature;

causing the plurality of test cases, each defining a sequence of natural language steps, to be displayed via the natural language interface for review and selection;

receiving, via the natural language interface, a second user input selecting a test case from the plurality of test cases displayed via the natural language interface;

generating, based on the second user input selecting the test case, a second probabilistic model query and a second contextual input defining an expected software implementation output format;

providing the second probabilistic model query to the probabilistic model;

receiving, from the probabilistic model, a second model output comprising a software implementation of the test case;

causing the software implementation of the test case to be displayed via the natural language interface with a request to confirm the software implementation;

receiving, via the natural language interface, a third user input confirming the software implementation;

executing, based on the third user input confirming the software implementation, the software implementation to perform the sequence of natural language steps, defined by the test case, process for evaluating the aspect of the expected functionality of the software feature;

extracting log data defining an outcome of the execution of the software implementation;

comparing the log data against a success condition defining an expected outcome of the sequence of natural language steps, defined by the test case, for evaluating the aspect of the expected functionality of the software feature; and classifying the execution of the software implementation as passed or not passed based on the comparison of the log data against the success condition.

7. The system of claim 6, wherein the operations further comprise:

detecting a preexisting software implementation of the test case in a software test bank;

extracting the preexisting software implementation from the software test bank; and including the preexisting software implementation in the second model output.

8. The system of claim 6, wherein the operations further comprise:

processing a software syntax of the software implementation of the test case;

determining that the software implementation is free of syntactical errors; and in response to determining that the software implementation is free of syntactical errors, enabling the execution of the software implementation.

9. The system of claim 6, wherein the second contextual input defining the expected software implementation output format comprises generic software functions for performing an associated test case.

10. The system of claim 9, wherein the generic software functions comprise automated commands for manipulating a graphical user interface.

11. A computer-readable storage medium storing instructions that, when executed by one or more processing units, cause a system to perform operations comprising:

receiving, via a natural language interface, a first user input including a first natural language description defining an expected functionality of a software feature and a second natural language description defining a process for using the software feature;

generating, based on the first natural language description and the second natural language description, a first probabilistic model query including a first contextual input defining an expected test case output format;

providing the first probabilistic model query to a probabilistic model;

receiving, from the probabilistic model, a first model output comprising a plurality of test cases for the software feature in accordance with the first contextual input defining the expected test case output format, an individual test case defining a sequence of natural language steps for evaluating an aspect of the expected functionality of the software feature;

causing the plurality of test cases, each defining a sequence of natural language steps, to be displayed via the natural language interface for review and selection;

receiving, via the natural language interface, a second user input selecting a test case from the plurality of test cases displayed via the natural language interface;

generating, based on the second user input selecting the test case, a second probabilistic model query and a second contextual input defining an expected software implementation output format;

providing the second probabilistic model query to the probabilistic model;

receiving, from the probabilistic model, a second model output comprising a software implementation of the test case;

causing the software implementation of the test case to be displayed via the natural language interface with a request to confirm the software implementation;

receiving, via the natural language interface, a third user input confirming the software implementation;

executing, based on the third user input confirming the software implementation, the software implementation to perform the sequence of natural language steps, defined by the test case, for evaluating the aspect of the expected functionality of the software feature;

extracting log data defining an outcome of the execution of the software implementation;

comparing the log data against a success condition defining an expected outcome of the sequence of natural language steps, defined by the test case, for evaluating the aspect of the expected functionality of the software feature; and classifying the execution of the software implementation as passed or not passed based on the comparison of the log data against the success condition.

12. The computer-readable storage medium of claim 11, wherein the operations further comprise:

detecting a preexisting software implementation of the test case in a software test bank;

extracting the preexisting software implementation from the software test bank; and including the preexisting software implementation in the second model output.

13. The computer-readable storage medium of claim 11, wherein the operations further comprise:

processing a software syntax of the software implementation of the test case;

determining that the software implementation is free of syntactical errors; and in response to determining that the software implementation is free of syntactical errors, enabling the execution of the software implementation.

14. The computer-readable storage medium of claim 11, wherein the second contextual input defining the expected software implementation output format comprises generic software functions for performing an associated test case.

* * * * *